United States Patent [19]

Dombi

[11] Patent Number: 5,612,969
[45] Date of Patent: Mar. 18, 1997

[54] TRANSVERSALLY PUMPED SOLID STATE LASER

[75] Inventor: Adam Dombi, Zurich, Switzerland

[73] Assignee: Balzers Aktiengesellschaft, Furstentum, Liechtenstein

[21] Appl. No.: 454,322
[22] PCT Filed: Jan. 21, 1995
[86] PCT No.: PCT/EP95/00216
  § 371 Date: Jun. 2, 1995
  § 102(e) Date: Jun. 2, 1995
[87] PCT Pub. No.: WO95/20833
  PCT Pub. Date: Aug. 3, 1995

[30] Foreign Application Priority Data

Jan. 29, 1994 [DE] Germany .......................... 44 02 668.4

[51] Int. Cl.[6] .............................. H01S 3/091; H01S 3/094
[52] U.S. Cl. ................................................ 372/75; 372/70
[58] Field of Search .................................. 372/26, 70, 75, 372/101

[56] References Cited

U.S. PATENT DOCUMENTS 5,349,600  9/1994  Shinbori et al. ........................ 372/70

Primary Examiner—Rodney B. Bovernick
Assistant Examiner—Robert E. Wise
Attorney, Agent, or Firm—Notaro & Michalos P.C.

[57] ABSTRACT

A solid state layer includes a rod-like laser crystal which is stimulated by two transversally pumped light beams along at least a portion of the length of the crystal. This causes the light beam along the axis of the laser crystal to be modulated in its intensity so that in the axis direction, areas of high and relatively low energy density are created. Alteratively, a single transversally coupled light beam pump which includes a frequency doubling crystal is utilized instead of two separate pump light beams.

20 Claims, 4 Drawing Sheets

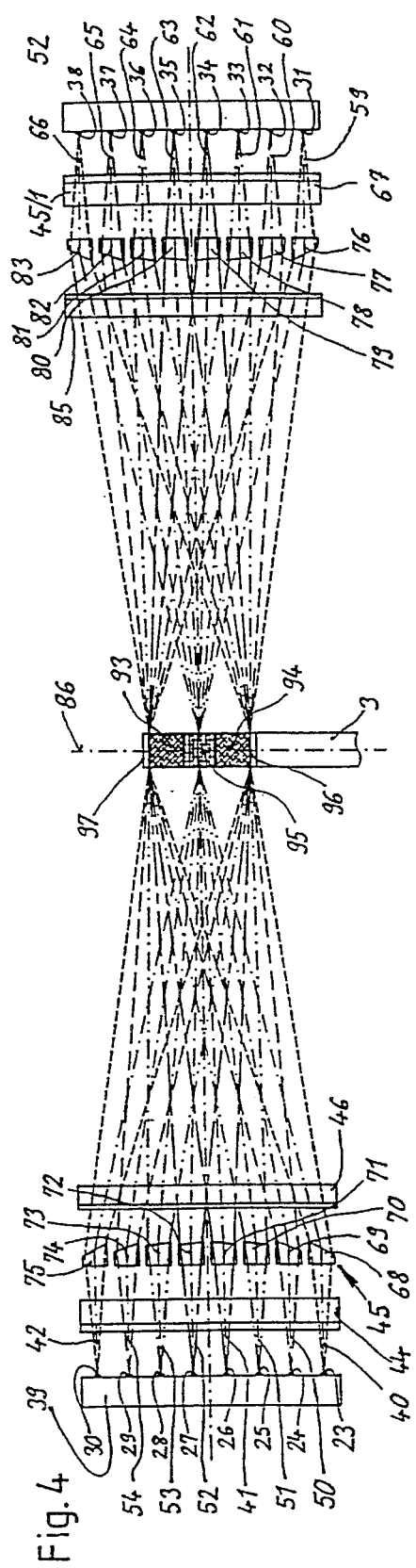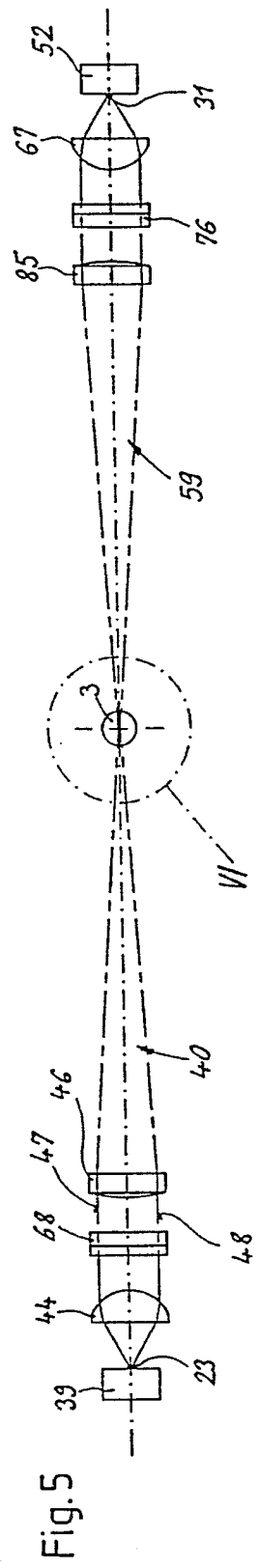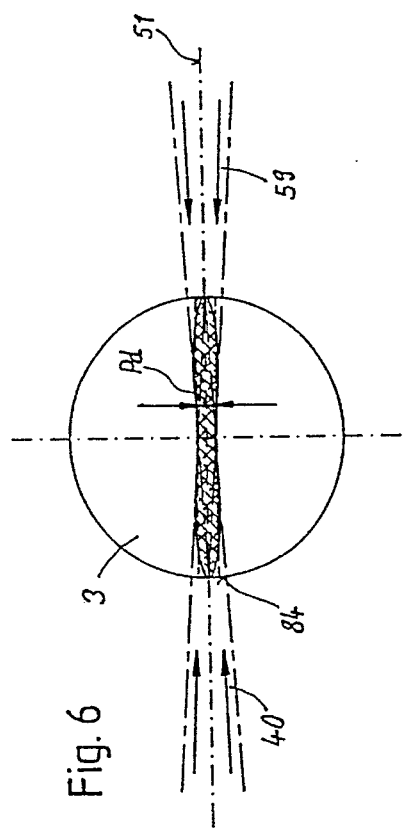
Fig. 4
Fig. 5
Fig. 6

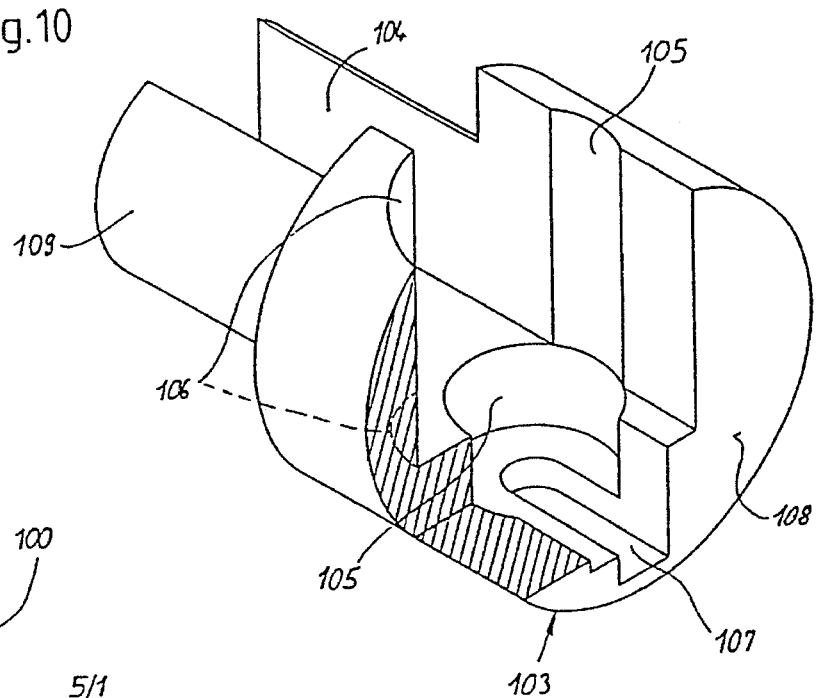
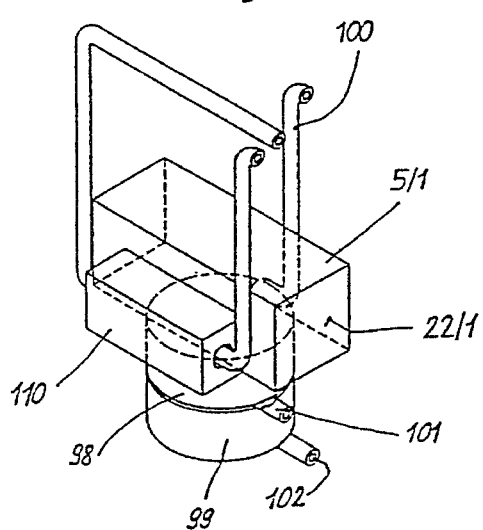
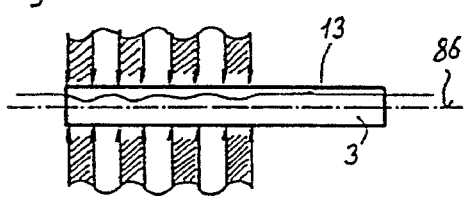
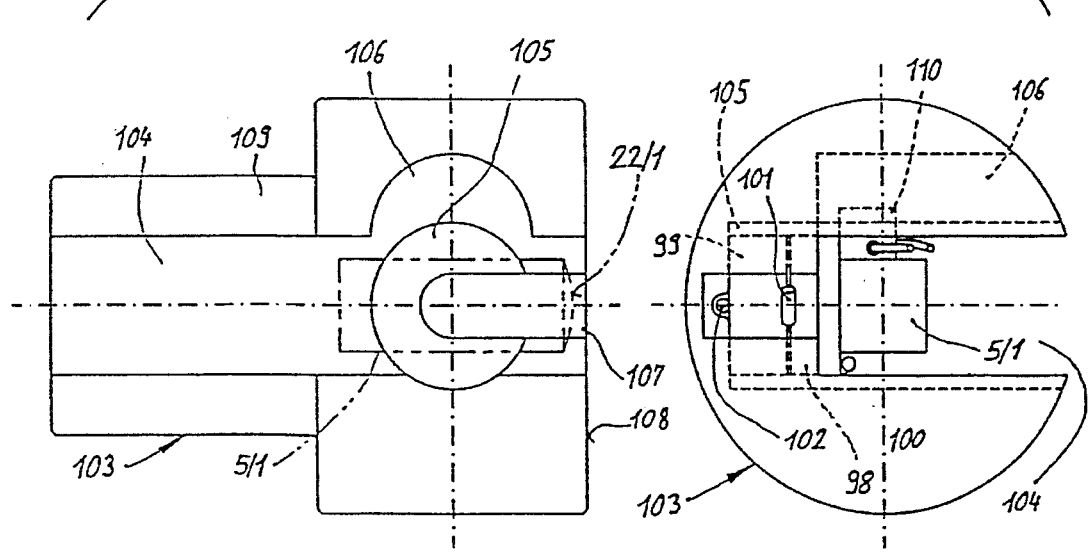

TRANSVERSALLY PUMPED SOLID STATE LASER

DESCRIPTION

The invention refers to a solid state laser with a resonator and a rod-like laser crystal placed mainly parallel to the axis of the resonator which is stimulated by at least two transversally in-coupled, axis-symmetrical pump light beams on at least a part of its length.

It is known that a solid state body consists of a laser crystal which is formed rod-like, cylindric laser crystal and of a pump light source placed in radial distance to the laser crystal. In addition there are regularily placed optic mirrors which either are set upon on the front surfaces of the laser crystal or are placed within a corresponding opto-mechanics in a distance to the front surfaces of the laser crystal. One of these two mirrors is fully reflecting, and the second mirror is partially transparent and formed as a neutralizing mirror from which the laser beam exits.

When operated, the laser crystal is loaded by the pump light source with light energy, whereby the laser crystal as an active medium absorbes light energy of a certain wavelength. By this absorbtion the laser crystal and its crystal ions are stimulated into a higher energy level. From this stimulated energy state the laser ions return back to a lower energy level by emitting laser light energy.

The conventional pump light sources used for a pulsed emission for instance are xenon flash lights or crypton high pressure gas discharge lamps for a continuous emission.

In addition also laser diode arrangements are used as pump light sources which have the advantage that their emitted pump laser beam can be adjusted to the corresponding absorption maximum of the laser crystal used. The result is that the solid state laser or the laser crystal can be pumped much more efficiently due to the reached high differential absorption than by conventional pump light sources which have a much larger light spectrum which can be absorbed by the laser crystal only within narrow ranges. All diode pumped solid state lasers have in common that the inversion necessary to produce a laser beam is provided within the laser crystal by the pump light energy of a system of one or more laser diodes as pump light source. There are different ways to couple in the pump light power into the laser crystal, usually the difference is made between longitudinal and transversal pumping.

When transversally pumped, the in-coupling of the stimulating light or the pump light beams into the laser crystal is done radially from the outside. The laser beams produced within the laser crystal by the pump light beams propagate vertically in the laser crystal and are reflected by mirrors placed on each front side so that in the laser crystal or in the resonator a standing laser light source is formed. By continually pumping the laser crystal with pump light this standing wave is continuously enhanced. One of the two reflecting mirrors is partially transparent and serves as a so-called neutralizing mirror, i.e. that a part of the laser light beam exits from the solid state body or the resonator in form of a laser beam.

In order to obtain a maximum energy efficiency it is necessary to adjust the reflecting mirror very precisely so that the produced laser beams always pass the laser crystal completely and that possibly no spread losses do occur. Further it is common to set a so-called frequency doubling crystal in the path of rays of the laser beam between the laser crystal and the high reflecting reflector; this frequency doubling crystal is meant to generate higher harmonics of the fundamental oscillation, e.g. second harmonic oscillation.

Reflectors can also be used as neutralizing mirrors if they are transparent only for the corresponding harmonic of the laser beam and which completely reflect the fundamental of the laser beam produced in the laser crystal so that only the harmonic leaves the solid state laser as a laser beam.

The production of such a reliable and efficient working as well as the profitable production of such a frequency doubling laser system is coupled with several difficulties.

Thus the opto-mechanics, i.e. the mechanics necessary for the arrangement and the fixing of the elements of the resonator relative to one another require extreme efforts. As the opto-mechanics must be worked out very precisely it contributes significantly to the costs of a solid state laser. The mechanics consist of precisely worked mechanic parts which must hold the optical elements holding. Due to thermal influences, i.e. temperature differences depending of the location of operation of a solid state laser high requirements have to be met with respect to the temperature stability of the entire opto-mechanics. Known opto-mechanic systems are also very sensitive to shocks so that it often happens that a solid state laser and/or its resonator have to be re-adjusted.

Another problem with solid state lasers is the so-called "thermal-lensing". This happens if an optical lens effect is produced in a usually homogeneous laser crystal material, resulting from the formation of a temperature gradient vertically to the optical axis within the laser crystal. This means that the laser crystal has different temperatures all over its cross section during operation. The temperature gradients formed during the operation in several areas modify the refractive index of the laser crystal and lead to a deflection of the laser beam within the laser crystal which leads to image errors. Depending of the power of the solid state laser the temperature gradients differ in magnitude, i.e. the more powerful the solid state laser the higher is the number of temperature gradients. This again leads to laser beams which run not in a parallel bundle in the laser crystal and also when leaving it, but they then show a beam divergence depending on the corresponding power. This again influences the so-called resonator geometry, as not all laser beams produced in the laser crystal are completely reflected on the reflectors and a part of the beams reflected by the reflectors are not reflected back into the laser crystal. This leads to higher losses and with increasing pump power of the pump light source to a decreasing beam quality. In addition this "thermal-lensing" also results in a decrease of the light capacity circulating within the resonator.

In case the frequency of the laser light is doubled by non-linear frequency doubling crystals the "thermal lensing" effect is even more drastic. The reason for this is that the in-coupling of a non-diffraction limited laser beam into the frequency doubling crystal significantly decreases the frequency doubling efficiency.

With a frequency doubled, diode pumped solid state laser the "thermal lensing" effect is eminent as the pump energy density is very high within a relatively small active volume.

The use of state of the art DPSS lasers is meant to reduce the "thermal lensing" by complicated and costly concepts such as the slap geometry. This, however, means that other serious disadvantages such as a considerably higher laser threshold is accepted.

Another problem with a frequency doubled diode pumped solid state laser is the phase coupling between the fundamental and the first harmonic of the produced laser light. Such a phase coupling is necessary to prevent amplitude deviations. These amplitude deviations arise from interference, i.e. by the superposition of the fundamental and the first harmonic. If the phase difference changes, amplitude variations of the laser beam occur.

Prior art intra-cavitive frequency doubling resonators are formed as ring resonators to prevent these amplitude deviations. As these ring resonators are extremely expensive linear resonators are often used instead of the ring resonators. When using a linear resonator it is necessary to keep the resonator length constant to meet the so-called phase-matching-requirement, i.e. to reach a corresponding phase coupling between the fundamental and the first harmonic. With known systems, the required resonator length is kept constant by costly and sensitive control mechanisms which is necessary for keeping constant the temperature depending resonator length by corresponding correcting element.

If a frequency doubling system of a solid state laser shall work with constant efficiency within a large surrounding temperature range the temperature of the frequency doubling crystal must be kept constant. A constant temperature of the frequency doubling crystal is necessary to meet the above described phase-matching requirement. If such a frequency doubling system is operated at higher power levels, the temperature must be kept in a range between 40° and 70° to reduce the danger of the so-called "greytrack damage". The "greytrack damage" is a turning grey of the frequency doubling crystal as a result of absorbed harmonics of a higher order than the second harmonic of the fundamental. With prior art temperature stabilization systems the heating-cooling elements are used in connection with a temperature sensor. Usually such a heating-cooling element consists of an electric resistance or a Peltier element. To control the temperatures of this heating-cooling element a control electronics is required which states the temperature of the frequency doubling crystal by a temperature sensor installed on the frequency doubling crystal. The manufacture specifications for such a temperature control system are very tight as the time constant, which is relatively high in such systems, plays a decisive role.

Even low absorption of the frequency doubling crystal can cause a local self heating. If this heating is measured by the temperature sensor with delay, the phase-matching-angle is detuned depending of the temperature and the original output power at the harmonic decreases. With a decreasing original power of the harmonic the warming of the frequency doubling crystal decreases so that the power increases again and results in a new temperature increase. On the whole this leads to power oscillations of the solid state laser which are difficult to control, and which are not at all desirable.

Accordingly the task for the invention is to create a solid state laser of the same kind with a significantly higher efficiency. At the same time the production costs should be lower than for known systems. Another goal is to keep the model size of the solid state laser or the resonator as small as possible. With the present invention the problem is solved by modulating the transversally pump light in the direction parallel to the laser crystal axis of the laser crystal in its intensity so that in the direction of the axis areas of higher energy density lie behind areas of lower energy density whereby the number of the areas with lower energy density is one higher than the number of areas with high energy density.

Furthermore, according to the present invention, the rear surface of the frequency doubling crystal for the passive phase coupling between the fundamental of the light source generated by the laser crystal and the first harmonic in relation to the fundamental generated by the frequency doubling crystal is formed as a fully reflecting laser mirror.

Another solution of the task consists of keeping constant the temperature of the frequency doubling crystal according to claim 13 by one or more PTC heating cells placed thermally in series and electrically in parallel, standing in direct thermal contact and whose electric resistances decrease above a certain temperature.

Another solution for the task is that all resonator components and the laser crystal are built together into an integrated construction element and are placed in a common supporting tube.

With the construction according to the invention as claimed in claim 1 a complete compensation of the so-called "thermal lensing" is obtained. Controlled, thermic lenses are built up within the laser crystal by the intensity modulated pump light beam in the direction of the axis laser crystal. The pump intensity gradients produced along the axis of the laser crystal automatically lead to changing, repeating temperature gradients so that in the direction of the axis thermal lenses with positive and negative foci lie behind each other. If this modulation relation is correctly adjusted with respect to the axis of the crystal, i.e. if there is one more area with lower energy density than there are areas with high energy density there is a complete compensation of the thermal lensing effect so that thermal lensing no longer affects neither the geometry nor the efficiency of the laser. With the inventive realization with diffraction limited divergence an increase of the power level of 5 up to 10 times is possible for diffraction limited divergence.

With the inventive realization according to claim 9 the costly and sensitive control electronics including the correcting elements to keep the resonator length constant are no longer necessary. With this realization a profitable linear resonator model is reached which does not require an active length stabilization of the resonator. Due to the fact that the temperature of the frequency doubling crystal has to be kept constant anyway it is not subjected to length variations which means that no interferences and thus no power fluctuations are provoked.

Another way of saving costs is reached by the realization according to claim 13. The PTC heating cells have a constant temperature as far as they are operated at a constant voltage according to claim 14. If such a constant voltage is operated on the PTC cells a well defined temperature, i.e. the desired temperature in the frequency doubling crystal is detained within a very short time. Due to the extremely good heat conductivity of the PTC cells heat generated in the frequency doubling crystal is well conducted. By the automatic control of this arrangement the thermal reaction time of the temperature sensor is no longer an issue present and one which results in a (more or less) elimination of the above-mentioned oscillations. Thus the features of claim 13 also support the stabilization of the laser and at the same time the costs for this temperature control amount to only a fragment of already known active control devices.

By operating the PTC heat cells with a variable operational voltage according to claim 15 a fine adjustment of the frequency doubling crystal temperature and thus an additional stabilization of the wavelength of the produced laser beam is reached.

The new and inventive integrated construction according to claim 17 means an important saving of costs and size with the same function at a performance at least comparable to prior art systems. The saving factor can be rated at about ten. This integrated construction could be realized by glueing all resonator components as well as the corresponding laser crystal according to claim 18 under interferrometric control into a heat conducting supporting tube of monocoque construction using a glue hardening under UV light.

Other advantageous realizations of the invention are described in claims 3 through 8, 10, 11, 12, 14, 16, 19 and 20.

The figures are meant to describe the invention more specifically.

FIG. 4 shows a plan view of the pump light beam with the pump diode rows placed symmetrically to the laser crystal;

FIG. 5 shows a profile view of the pump light beam shown in FIG. 4;

FIG. 6 shows an enlarged section VI of FIG. 5;

FIGS. 7a and 7b show the intensity distribution of a pump diode:
a) in vertical direction
b) in horizontal direction;

FIG. 8 shows a characteristic modulation curve of the pump beams of FIG. 4 through FIG. 6;

FIG. 9 shows a frequency doubling crystal with temperature control elements;

FIG. 10 shows a housing to receive the frequency doubling crystal from FIG. 9;

FIG. 11 shows a plan view and a profile view of the housing of FIG. 10 with the frequency doubling crystal and the temperature control elements of FIG. 9;

FIG. 12 shows the course of an intensity modulated laser beam in the laser crystal The following described invention is explained by means of an example of a frequency doubled diode pumped solid state laser, namely a Yb:YAG laser.

Figure 1:
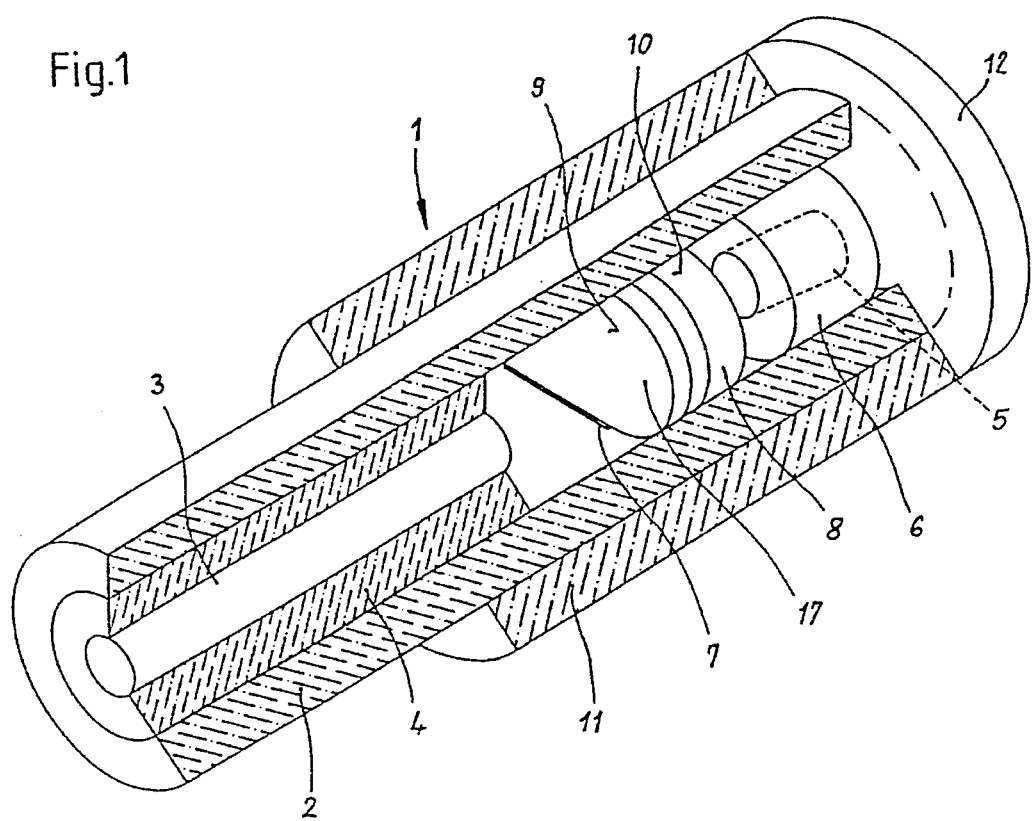
FIG. 1 shows a resonator as of the invention in a perspective part-sectioned drawing.

FIG. 1 in a perspective sectional view shows a resonator 1 built according to the invention. A supporting tube 2 functions as intregration component which receives all resonator components. The supporting tube 2 consists of a heat conducting and light transparent material such as $SiO_2$ or Zerodur. In the front area of the supporting tube is placed an Yb:YAG laser crystal 3 which is held coaxially in the supporting tube 2 by means of a interposed tube 4. The outer diameter of the supporting tube with this realization example is about 10 mm, the outer diameter of the interposed tube or the inner diameter of the supporting tube is about 6 mm. The laser crystal 3 is 15 mm long and has a diameter of 2.5 mm. The entire length of the supporting tube 2 is 40 mm.

In the rear end area of the supporting tube 2 a cylindric crystal carrier 6 receives the frequency doubling crystal 5 which is clearance free supported in the supporting tube 2. The crystal carrier 6 is 5 mm long and has a diameter of 6 mm. In the supporting tube 2 a polarization filter 7 is placed between the laser crystal 3 and the crystal carrier 6. A biconvexe focussing lense 8 is placed on the crystal carrier side of this polarization filter. The focussing lense 8 as well as the polarization filter 7 are attached to a cylindrical jacket 9 and 10 which cover at least partially the resonator 1 and are aligned parallel to the axis of the resonator; each of this surface having an outer diameter of 6 mm so that the polarization filter 7 and the focussing lens 8 are mounted without clearance in the supporting tube 2. There are glue connections for the non-movable fastening of the focussing lens 8, of the polarization filter 7 of the crystal carrier 6, and the interposed tube 4 lying in axis direction of the supporting tube 2. The polarization filter 7 is placed under a polarization angle of 45° in the supporting tube 2. The supporting tube 2 is covered by an encasing tube 11 with a shutting base plate 12 which is also fixed to the supporting tube 2 by a glue connection. The thickness of the supporting tube 2 and the encasing tube 11 as well as the floor plate 12 of the encasing tube 11 all are 2 mm so that the entire length of the resonator amounts to 42 mm.

The glue is a glue hardening under UV light so that all resonator components and the laser crystal can be adjusted very precisely by interferrometric control and the glue is then hardened by UV light irradiation which results in a permanent fixation of the resonator components and the laser crystal 3 within the supporting tube.

Figure 2:
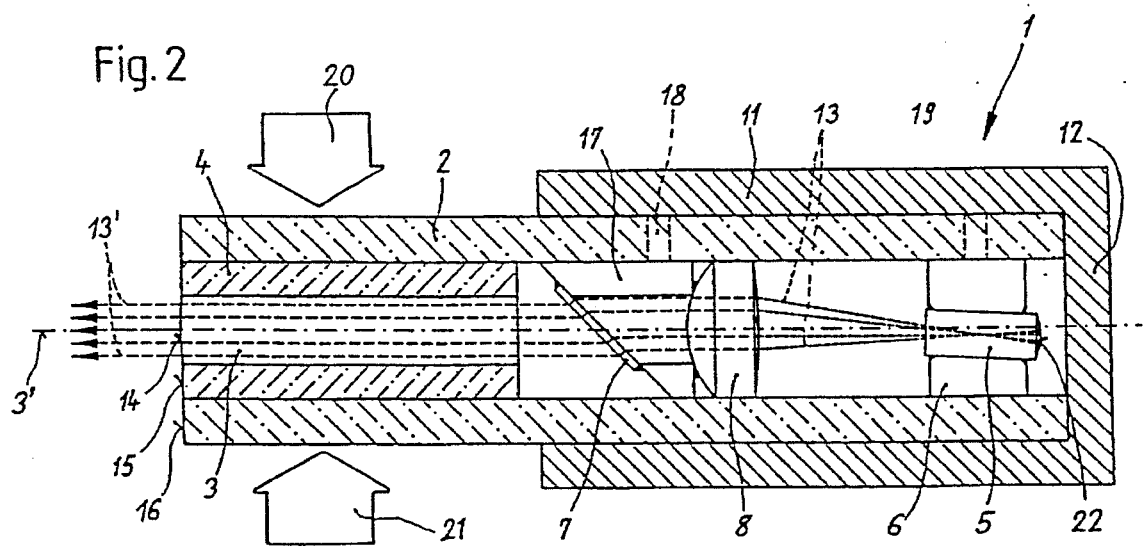
FIG. 2 shows a resonator as of FIG. 1 in a longitudinal cross section.

FIG. 2 shows the longitudinal view of the resonator 1 from FIG. 1, the rays of the laser beam 13 being depicted by dotted lines. The laser crystal 3 and the interposed tube 4 with their front surfaces 14 and 15 close tightly with the front surface 16 of the supporting tube 2. FIG. 2 shows that radial drillings 18, 19 are made in the supporting tube 2 in the region of the polarization filter or the supporting element 17 of the polarization filter 7 and the crystal carrier 6. These drillings are made to inject the glue in each slid between the corresponding components.

In the area of the laser crystal 3 the resonator 1 is loaded by two symmetric pump light beams which load the supporting tube 2 radially (represented as arrow). With the present realization example of a Yb:YAG laser the wavelength of the pump light beam is 941 nm. The pump light beams 20 and 21 penetrate both the supporting tube 2 as well as the filling tube 11 and activate the laser crystal 3. The laser beams 13 induced in the laser crystal 3 by the pump light beams 20 and 21 oscillate between the front surface 14 of the laser crystal 3 und the rear surface 22 of the frequency doubling crystal 5. The laser light induced in the laser crystal 3 has a wavelength of 1031 nm. To guarantee a maximum of reflection of the laser beams in the resonator 1 at the front surface 14, the laser crystal 3 is partly metallized and has a convexity radius of 55 mm. For the reflection of the laser beam 13 the rear surface 22 of the frequency doubling crystal is convex with a radius of the convexity of 2.5 mm, whereby the rear surface is completely metallized. In the frequency doubling crystal 5 the laser beam 13 is frequency doubled to a wavelength of 515 nm and this area is reflected back to the laser crystal 3. The metallization of the front surface 14 is chosen so that it is transparent for a wavelength of 515 nm so that the laser beams 13' (dotted arrows) of this wavelength are coupled out at the front surface 14, i.e. they leave the laser crystal 3 as a focused laser beam. The laser beam 13 is polarized into surrounding waves when passing through the polarization filter 7 placed between the frequency doubling crystal 5 and the laser crystal 3 and is focussed into the frequency doubling crystal 5 when passing through the focussing lens 8. The focal length of the focussing lens 8 and the distance between the focussing lens and the frequency doubling crystal 5 are chosen so that the focus of the focussing lens 8 lies centrally in the vertical middle of the frequency doubling crystal 5 so that the frequency of the laser light beams 13 in the frequency doubling crystal 5 is doubled and are reflected in itself.

It is obvious that laser designs require other dimensions. Therefore, the convexity of the laser crystal's 3 front surface 14 is not imperative. For a solid state laser the requirement is to choose a stable resonator geometry defined by the corresponding wavelength of the generated laser beam.

The pump light beams 20 and 21 are generated by 8 laser diodes 23, 24, 25, 26, 27, 28, 29, 30 and 31, 32, 33, 34, 35, 36, 37, 38 which are placed diametrally and symmetrically opposite each other related to the vertical axis 3' of the laser crystal (FIG. 4, 5)

Figure 3:
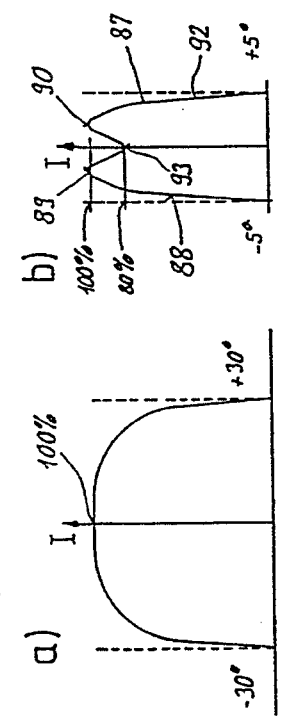
FIG. 3 shows an arrangement of laser diodes with laser crystal and the corresponding lens and prism system.

In FIG. 3 the basic arrangement of the laser diodes 23 through 30 related to the laser crystal 3 is shown in a perspective view. For clarity reasons the second diode row lying diametrically opposite to the laser diodes 23 through 30 and symmetrically to the laser crystal 3 is not depicted. The laser diodes 23 through 30 are placed in regular distances to each other on a carrier block 39. FIG. 3 gives an example of the rays of the pump beams 40, 41, 42 of the laser diodes 23 and 26 and 30. For the pump beam formation there is a lens system 43 which consists of three elements for each laser diode 23 through 30. The lens system 43 consists of a plane convex lens 44 extending over the entire length of the carrier block 39; it is a prism system 45 realized like a Fresnell lens and an adjacent convex plane diffraction lens 46. The ray tracing of the pump light beams 40, 41 and 42 of the laser diodes 23, 26 and 30 is shown in FIG. 3. By lens 44 and the diffraction lens 46 the pump light beams 40, 41, and 42 diverging in the vertical direction are refracted this way so that they enter vertically the laser crystal's 3 surface. The refraction index of the lens 44 is chosen in a way that the pump light beams 40, 41, and 42 run parallel between the lens 44 and the diffraction lens 56. The focal length of the diffraction lens 46 is chosen in a way that the pump light beams 40, 41, 42 cross about opposite of the entry area lying surface 50 of the laser crystal in its horizontal plain. The prism system 45 is placed between the lens 44 and the diffraction lens 46. Each pump light beam 40, 41, and 42 is diverted of the horizontal by the prisma system in a way that the pump light beams 40, 41 and 42 in the laser crystal cover each other alltogether.

FIG. 4 shows a plan view of the laser crystal 3, the laser diodes 23 through 30 as well as the laser diodes 31 through 38 in their symmetric placing to the laser crystal 3. The laser diodes 31 through 38 are also placed on a carrier block 52. Between the laser diodes 23 through 30 is placed the lens system 45 and between the laser diodes 31 through 38 is placed a second lens system 53 which is also formed by a plane convex lens 67, a prisma system 45/1 and a convex plane diffraction lens. On the horizontal plain the dotted pump light beams 40, 41, 42, 54, 55, 57 and 58 of the laser diodes 23 through 30 as well as the pump light beams 59, 60, 61, 62, 63, 64, 65, and 66 of the laser diodes 31 through 38 diverge with a divergence angle of approximately 10° and run straight through the lens 44 of the laser diode 23 through 30 and the lens 67 of the laser diodes 31 through 38 to the corresponding diffraction prisms 68, 69, 70, 71, 72, 73, 74 and 75 of the laser diodes 23 through 30 and the corresponding diffraction prisma 76, 77, 78, 79, 80, 81 and 83 of the laser diodes 31 through 38. The corresponding pump light beams 40, 41, 42, 55 through 58 and 59 through 66 are refracted by the diffraction prisms 68 through 75 and 76 through 82 in a way that they superimpose themselves in the laser crystal 3. The pump light beams 40, 41, 42, 55 through 58 and 59 through 66 enter the laser crystal 3 over a length of about 6.25 mm and superimpose each other.

FIG. 5 shows the course of the pump beams of the laser diodes 23 through 30 and the pump light beams of the laser diodes 31 through 38 in the vertical, both lines running an identic course. An example of this course is shown by the course of pump light beam 40 of the laser diode 23 and 59 of the laser diode 31.

The pump light beam 40 has its origin in the laser diode 23 and diverges with a divergence angle of approximately 60° to the lens 44. By the lens 44 the pump light beam is refracted in a way that its limiting beams 47 and 48 pass parallel and horizontal through the corresponding prism 68. The pump light beam 40 is refracted by the diffraction lens 46 in a way that it enters into the laser crystal 3 almost vertically. The focal length of the diffraction lens 46 is chosen so that the pump light beams 40 of the laser diode 23 cross approximately in the horizontal plain 51 of the laser crystal in the area of the surface 50 lying opposite to the entry side 84 (FIG. 6). Mirror-symmetrically to this course of the pump light beam 47 runs the pump light beam 59 which also passes through a lens 67, the prisma 76 and diffraction lens 85. With said arrangement in the concrete realization an average pump thickness Pd of 150 µm is reached when the distance of the laser diodes 23 through 30 and 31 through 38 to the vertical middle axis 86 of the laser crystal 3 is 37.5 mm. The laser crystal 3 has a diameter of 2 mm so that with the average pump thickness Pd and the pump length 6.25 mm loaded by the pump beams the resulting pump volume or active volume of the laser crystal is 1.88 m³.

To build up controlled thermal lenses and to compensate the "thermal lensing" an intensity modulated pump beam is required where in the vertical direction of the laser crystal 3 areas with a 100% pump radiation energy change with areas of a 80% pump radiation energy.

These percentage intensity relations can of course vary for a different laser design. It is for instance possible that the pump beam energy has to be modulated up to 50% or 30% to fully compensate the "thermal lensing".

To reach this pump radiation modulation a laser diode is used which consists of a pump beam on the horizontal plain whose intensity course is shown in FIG. 7b. FIG. 7b shows an intensity distribution of such a pump diode depending of the divergence angle of the pump beam. The corresponding identification line 87 has an ascending flank 88, two intensity maxima 89, 90 an intensity minimum 91 lying between these intensity maxima 89, 90 and a descending side 92. By this intensity distribution the desired intensity modulated loading of the laser crystal 3 is reached by a corresponding beam diversion as shown in FIG. 4. The corresponding areas of high and low energy density in the laser crystal 3 with an intensity variation depending on the laser crystal length L is shown in FIG. 8 and has almost the same course as the intensity distribution of such a laser diode in FIG. 7b. Vertically to this intensity distribution of the laser diode the laser diode shows an intensity distribution as shown in FIG. 7a. This intensity distribution I is also depicted by the divergency angle of the laser diode which can be recognized in FIG. 5. Due to the ascending side 88 and the descending side 89 a 80% energy density is produced in this area and in the corresponding laser crystal section; in the areas of the intensity maxima 89, 90 in the laser crystal, however, rates of 100% energy density are reached. Thus, there is a 80% energy density area lying between the intensity maxima. In FIG. 4 these areas are specially marked, i.e. that areas of maximum energy density 93, 94 are diagonally shaded while the central area of low energy density 95 is vertically-horizontally shaded. Adjacent to it, on the outer rim of the two areas 93, 94 lie 80% energy density areas 96 and 97.

By these areas of different intensity or energy density 93, 94 and 95, 96 and 97 in the laser crystal 3 several, repeating temperature gradients are generated which lead to thermal lenses with positive and negative focal distance. As a result, the laser beam which due to the "thermal lensing" effect originally was diverted in only one direction and refracted is then diverted several times in different and opposite directions and thus leaves the laser crystal 3 on both sides straight and parallel to the optical axis which corresponds to the vertical middle axis 86.

To achieve this effect it is necessary that the number of areas with lower energy density 111, 112, 113, 114 is one higher than the number of areas with high energy density 115, 116, 117, 118 in order to realize a full compensation of the "thermal lensing" effect. The number of areas with high energy density and subsequent areas of lower energy density can also be increased. Further it is important that the entire activated laser crystal volume lying in the path of rays of the pump light beams in the vertical direction of the laser crystal is stimulated above the necessary absorption source.

This means that also areas with a low-percentage-loading by the pump light beam are pumped above the differential absorption threshold. In FIG. 12 the course of the laser beam 13 in case of complete compensation of the "thermal lensing" effect is depicted. It is visible that the laser beam 13 in the laser crystal 3 is diverted several times opposite and finally leaves the laser crystal parallel to the horizontal axis 86 of the laser crystal 3. The losses of a laser caused by the spread or the inclination of the laser beam 13 due to the "thermal lensing" effect thus is significantly reduced or prevented so that the laser power can be increased by a factor of 5 to 10.

If pump light beams are used, such as discharge lamps but also laser diodes which have no corresponding intensity distribution of their pump light beam the intensity modulation can be reached by inter-connecting a modulation grid. The modulation grid is placed between the pump light source and the laser crystal and subsequently covers parts of the laser crystal. The modulation grid in these areas may consist of a part-permeable material which partly absorbs the pump radiation energy so that different intensity modulations can be reached.

The modulation grid can however consist of a fully opaque material so that a different intensity modulation can be reached depending of the chosen relation between permeability range and shading range of the modulation grid.

As can be seen in FIG. 1 and 2 the disclosed resonator can include a frequency doubling crystal 5 in order to shorten the wavelength of the laser light, i.e. to double its frequency. In FIGS. 9 through 11 such a frequency doubling crystal or his crystal carrier which was shown only basically in FIG. 1 and in FIG. 2 is depicted more detailed.

In the Yb:YAG laser described in the realization a KTP crystal is used for the frequency doubling. FIG. 9 shows that the KTP crystal 5/1 is rectangular with an edge length of 2 mm and a total length of 5 mm. Beneath the KTB crystal two electrically parallel PTC heating cells 98, 99 are placed. These PTC heating cells are components whose electric resistance decreases once a certain temperature is achieved. The PTC Heating cells 98, 99 are thermally connected to the KTP crystal 5/1, the PTC heating cell 98 is thereby directly placed on the lower plain surface of the KTP crystal 5/1. One of the front surfaces 22/1 of the KTP crystal 5/1 has a convex form (see also FIG. 2) and by a corresponding coating serves as reflector in the resonator from FIG. 1. This results in a passive phase coupling between the fundamental and the first harmonic of the laser beam reflected in the KTP crystal. By this front surface 22/1 serving as direct resonator mirror no active control electronics with corresponding mechanic correcting elements are necessary to stabilize the lengths of the resonator 1, especially not as the temperature of the KTP crystal 5/1 has to be kept constant anyway.

The temperature of the KTP crystal 5/1 is kept constant by the heating cells 98, 99 placed at its lower plain surfaces. For this purpose the PTC heating cells are loaded by corresponding connection lines 100, 101 and 102 with a corresponding supply with an operation voltage of about 10 V. With this operation voltage a defined required temperature of approximately 50° C. is reached in the KTP crystal within a very short time. Due to the rather good heat conductivity of the PTC heating cells 98, 99 additional heat in the KTB crystal 5/1 is very well deducted so that the temperature of the KTP crystal is permanently held constant. Therefore by simply setting a constant voltage to the heating cells 98, 99 the optimal operation temperature of the KTP crystal 5/1 can be set and be kept constant.

For an additional stabilization of the wave length of the frequency doubled laser beam the PTC heating cells 98, 99 can also be operated with a variable voltage which is set by means of corresponding control electronics depending of the actual KTP temperature. To measure the temperature of the KTP crystal 5/1 a sensor such as a photo cell may be used. This allows an additional precise adjustment of the KTP crystal 5/1 temperature and thus allows an additional stabilization of the KTP crystal 5/1 and a stabilization of the wavelength.

FIG. 10 shows a frequency doubling housing 103 for the integration of the whole KTP crystal 5/1 and PTC heating elements unit into the resonator 1 from FIG. 1. The frequency doubling housing 103 has a continuous vertical slit 104 which is fitted with a corresponding receiving drilling 105 and a circular recess 106; on one of the rear surfaces 108 it is also fitted with a slit 107 placed in the receiving drilling 105 for the connection wire 101 of the PTC heating cell 99. As becomes obvious from FIG. 11, the KTP crystal 5/1 with its two heating cells 98, 99 is integrated in the frequency doubling housing 103. The frequency doubling housing 103 can be inserted (from the rear side) into the supporting tube 2. Fixation is achieved by using UV-hardening glue. The frequency doubling housing 103 preferably is made of MACCOR ceramics.

In addition there is a measuring NTC 110 working as a start retarding sensor to monitor the temperature of the frequency doubling crystal which only releases the laser diodes 23 through 30 and 31 through 38 and thus the laser operation by a correponding start electronics if in the frequency doubling crystal 5/1 the required operating temperature between 40° through 70° is reached. This effectfully prevents the destruction of the laser crystal 3.

By the inventive laser design a solid state laser is made available which can be produced at profitable costs. At the same time this solid state laser or a solid state laser manufactured according to the present concept has a higher efficiency than all prior art solid state lasers. Depending of the field of use the individual inventive features, such as the pump intensity gradient to compensate the "thermal lensing" effect as well as the direct metallization of the frequency doubling crystal and the laser crsytal on the one hand but also the way of keeping the temperature of the frequency doubling crystal constant is suited to be used separately on a possibly existing system so that with the existing state of the art also existing laser systems can be supplemented at profitable costs.

What is claimed is:

1. Solid state laser consisting of a resonator and a mainly parallel to the resonator axis placed rod-like laser crystal stimulated by at least on a part of its length by two transversally pump light beams coupled-in, placed symmetrically to the axis whereby the transversally running pump light beam in the axis direction of the laser crystal is modulated in its intensity so that in the axis direction there change areas of high energy density with areas of lower energy density, whereby the number of areas with lower energy density is one smaller than the number of areas with high energy density.

2. Solid state laser as claimed in claim 1 whereby the pump light beam is generated by laser diodes which are placed diametrically and symmetrically opposite each other refering to the laser crystal axis whereby on each side of the laser crystal there is placed at least one laser diode.

3. Solid state laser as claimed in claim 2 whereby on each side of the laser crystal are placed eight laser diodes.

4. Solid state laser as claimed in claim 1 whereby the pump light beams are focussed by optical lens and/or prism systems so that they enter vertically into the laser crystal surface and whereby the foci of each lens and or prisma system lies at least close to the area of the entry side of the opposite lying surface of the laser crystal.

5. Solid state laser as claimed in claim 1 whereby the pump light beams load only a part of the total volume of the laser crystal as active volume.

6. Solid state laser as claimed in claim 5 whereby the pump light beams only admit and activate only a part of the laser crystal profile.

7. Solid state laser as claimed in claim 1 whereby the entire activated laser crystal volume lying within the path of rays of the pump light beams is stimulated without interruption above the necessary differential absorption threshold.

8. Solid state laser as claimed in claim 1 whereby the pump light beam is generated by a xenon impulse lamp or a crypton high pressure lamp or the same and whereby for the modulation of the pump light beam's intensity a modulation grid is intended which consists of areas of lower and higher light transparency lying behind each other in axis direction of the laser crystal.

9. A solid state laser according to claim 1, wherein the rod-like laser crystal is stimulated at least on a part of its length by at least one transversally in-coupled pump light beam and further consisting of a frequency doubling crystal whereby the frequency doubling crystal for the passive phase coupling between the fundamental of the light source generated by the laser crystal and the first harmonic generated in reference to the fundamental is formed as a fully reflecting laser mirror on its rear front surface which is turned away from the laser crystal.

10. Solid state laser as claimed in claim 9 whereby the rear front surface is formed as a concave, metallized surface.

11. Solid state laser as claimed in claim 9 whereby the front side of the turned away frequency doubler of the laser crystal is formed as a neutralizing mirror.

12. Solid state laser as claimed in claim 11 whereby the front side of the laser crystal formed as a neutralizing mirror is slightly concave.

13. A solid state laser according to claim 1, wherein the rod-like laser crystal is stimulated at least on a part of its length by at least one transversally in-coupled pump light beam and further consisting of a frequency doubling crystal whereby in order to hold the temperature of the frequency doubler constant one or more thermic, electrically parallel coupled PTC heat cells placed in row are meant to stand in direct contact to the frequency doubling crystal and whose electric resistors decrease above a defined temperature.

14. Solid state laser as claimed in claim 13 whereby the PTC heat cells are operated by a constant electric voltage.

15. Solid state laser as claimed in claim 13 whereby the PTC heat cells are operated by a sensor stating the temperature of the frequency doubler and a corresponding controlling electronics with variable voltage so that a fine adjustment of the temperature and thus an additional stabilization of the frequency doubling crystal is made possible.

16. Solid state laser as claimed in claim 13 consisting of a start retarding sensor monitoring the temperature of the frequency doubling crystal is placed on the frequency doubling crystal whereby said sensor only releases the laser diodes and thus the laser operation by a corresponding start electronics if the frequency doubling crystal has reached the necessary temperature.

17. A solid state laser according to claims 1, whereby all resonator components and the laser crystal are taken together in an integrated assembly/component placed in a common supporting tube.

18. Solid state laser as claimed in claim 17 whereby the resonator components and the laser crystal are fixed within the supporting tube by means of a glue hardening by UV light.

19. Solid state laser as claimed in claim 17 whereby the supporting tube consists of a heat conducting and translucent material.

20. Solid state laser as claimed in claim 17 whereby the precise adjustment of the resonator components and of the laser crystal within the supporting tube is controlled interferrometrically.

* * * * *